United States Patent
Luo et al.

(10) Patent No.: US 7,020,201 B2
(45) Date of Patent: Mar. 28, 2006

(54) METHOD AND APPARATUS FOR MOTION ESTIMATION WITH ALL BINARY REPRESENTATION

(75) Inventors: Jeng-Hung Luo, Junghe (TW); Gen-Ming Lee, Tainan (TW); Chung-Neng Wang, Kaohsiung (TW); Tihao Chiang, Taipei (TW)

(73) Assignee: National Chiao Tung University, Hsinchu (TW)

( * ) Notice: Subject to any disclaimer, the term of this patent is extended or adjusted under 35 U.S.C. 154(b) by 639 days.

(21) Appl. No.: 10/301,415

(22) Filed: Nov. 20, 2002

(65) Prior Publication Data

US 2004/0095998 A1 May 20, 2004

(51) Int. Cl.
*H04B 1/66* (2006.01)
*H04N 7/12* (2006.01)

(52) U.S. Cl. .............................. 375/240.16

(58) Field of Classification Search ......... 375/240.12, 375/240.15, 240.16, 240.17, 240.19; 382/240, 382/236; H04N 7/12; H04B 1/66
See application file for complete search history.

(56) References Cited

U.S. PATENT DOCUMENTS

| 6,084,908 | A | 7/2000 | Chiang et al. | 375/240 |
|---|---|---|---|---|
| 6,130,912 | A | 10/2000 | Chang et al. | 375/240 |
| 6,148,027 | A | 11/2000 | Song et al. | 375/240 |
| 6,208,692 | B1 | 3/2001 | Song et al. | 375/240 |
| 6,229,850 | B1 | 5/2001 | Linzer et al. | 375/240 |
| 6,259,737 | B1 | 7/2001 | Fung et al. | 375/240 |
| 6,408,101 | B1 * | 6/2002 | Krishnamurthy et al. | 382/240 |
| 6,421,466 | B1 * | 7/2002 | Lin | 382/236 |
| 6,430,317 | B1 * | 8/2002 | Krishnamurthy et al. | 382/236 |
| 6,434,196 | B1 * | 8/2002 | Sethuraman et al. | 375/240.12 |
| 6,560,371 | B1 * | 5/2003 | Song et al. | 382/240 |
| 6,570,924 | B1 * | 5/2003 | Lynch et al. | 375/240.19 |
| 6,898,324 | B1 * | 5/2005 | Pesquet-Popescu | 382/240 |

OTHER PUBLICATIONS

"The Laplacian Pyramid as a Compact Image code", Peter J.Burt & Edward H. Adelson, IEEE Transactions on Communications,vol. COM-31, No. 4, Apr. 1983.

"Displacement estimation by hierarchical blockmatching", M. Bierling, SPIE vol. 1001 Visual Communications and Image Processing '88.

"Low-Complexity Block-Based Motion Estimation via one-Bit Transforms", Balas Natarajan, Vasudev Bhaskaran, and Konstantinos Konstantinides, IEEE Transactions on Circuits and Systems for Video Technology, vol. &, No. 4, Aug. 1997.

(Continued)

*Primary Examiner*—Tung Vo

(57) ABSTRACT

A method of motion estimation for video encoding constructs a binary pyramid structure having three binary layers. A state update module registers and updates repeat occurrence of final motion vectors and a static-state checking module determines if the method is in a static mode or a normal mode based on the repeat occurrence. In a normal mode, the first binary layer is searched within a ±3 pixel refinement window to determine a first level motion vector. In the second binary layer, a search range is computed based on six motion vector candidates. By checking every point within in the search range, a second binary layer search generates a second level motion vector. Finally, a third binary layer search within a ±2 pixel refinement window generates a final motion vector according to the second level motion vector. In a static mode, a fine tuning module performs search within a ±1 pixel refinement window and generates a final motion vector.

23 Claims, 13 Drawing Sheets

OTHER PUBLICATIONS

"A Fast Hierarchical Motion-Compensation Scheme For Video Coding Using Block Feature Matching", Xiaobing Lee & Ya-Qin Zhang IEEE, vol. 6, No. 6, Dec. 1996.

"New Fast Binary Pyramid MOtion Estimation For MPEG2 and HDTV Encoding", Xudong Song, Tihao Chiang, Xiaobing Lee, and Ya-Qin Zhang, IEEE, vol. 10, No. 7, Oct. 2000.

"Packed Binary Representations for fast motion estimation on general-purpose architectures", Sriram Sethuraman and Ravi Krishnamurthy, Part of the SI&T/SPIE Conference on Visual Communications and Image Processing '99, Jan. 1999.

"Modified One-Bit Transform for Motion Estimation", Peter H. W. Wong and Oscar C. Au, IEEE, vol. 9, No. 7 Oct. 1999.

* cited by examiner

Frame boundary

| 0 | $F_l(0,0)$ | $F_l(1,0)$ | $F_l(2,0)$ | $F_l(3,0)$ | $F_l(4,0)$ |
| 0 | $F_l(0,1)$ | $F_l(1,1)$ | $F_l(2,1)$ | $F_l(3,1)$ | $F_l(4,1)$ |
| 0 | $F_l(0,2)$ | $F_l(1,2)$ | $F_l(2,2)$ | $F_l(3,2)$ | $F_l(4,2)$ |
| 0 | $F_l(0,3)$ | $F_l(1,3)$ | $F_l(2,3)$ | $F_l(3,3)$ | $F_l(4,3)$ |

FIG. 6

| Sequence (Target bitrate, Size) | Method | Y_PSNR (dB) | U_PSNR (dB) | V_PSNR (dB) | Total Bits | Δ Y_PSNR (dB) |
|---|---|---|---|---|---|---|
| Mother-Daughter (24kbps, QCIF) | FS | 34.86 | 40.59 | 41.12 | 238928 | |
| | ABME_$H_A$ | 34.73 | 40.28 | 41.05 | 239072 | -0.13 |
| | ABME_$H_B$ | 34.74 | 40.30 | 40.99 | 239120 | -0.12 |
| | ABME_$H_C$ | 34.75 | 40.34 | 41.06 | 239904 | -0.11 |
| | ABME_$H_{20}$ | 34.77 | 40.31 | 41.01 | 239016 | -0.09 |
| | ABME_$H_{25}$ | 34.78 | 40.34 | 41.04 | 239200 | -0.08 |
| | ABME_$H_{30}$ | 34.74 | 40.26 | 41.04 | 239064 | -0.12 |
| Container (10kbps, QCIF) | FS | 29.84 | 37.39 | 36.64 | 98832 | |
| | ABME_$H_A$ | 29.60 | 37.35 | 36.43 | 99216 | -0.24 |
| | ABME_$H_B$ | 29.62 | 37.47 | 36.43 | 99952 | -0.22 |
| | ABME_$H_C$ | 29.60 | 37.26 | 36.40 | 99144 | -0.24 |
| | ABME_$H_{20}$ | 29.60 | 37.28 | 36.44 | 99304 | -0.24 |
| | ABME_$H_{25}$ | 29.63 | 37.41 | 36.45 | 99256 | -0.21 |
| | ABME_$H_{30}$ | 29.58 | 37.31 | 36.47 | 99176 | -0.26 |
| Coastguard (112kbps, CIF) | FS | 27.10 | 38.98 | 41.51 | 1116152 | |
| | ABME_$H_A$ | 26.73 | 39.13 | 41.64 | 1115072 | -0.37 |
| | ABME_$H_B$ | 26.87 | 39.07 | 41.82 | 1114904 | -0.23 |
| | ABME_$H_C$ | 26.90 | 39.03 | 41.54 | 1114568 | -0.20 |
| | ABME_$H_{20}$ | 26.89 | 39.02 | 41.58 | 1115520 | -0.21 |
| | ABME_$H_{25}$ | 26.95 | 39.19 | 41.81 | 1114800 | -0.15 |
| | ABME_$H_{30}$ | 26.92 | 39.04 | 41.93 | 1113264 | -0.18 |
| Foreman (112kbps, CIF) | FS | 30.19 | 36.79 | 37.53 | 1114624 | |
| | ABME_$H_A$ | 29.56 | 37.05 | 37.83 | 1114912 | -0.63 |
| | ABME_$H_B$ | 29.76 | 37.08 | 37.89 | 1114864 | -0.43 |
| | ABME_$H_C$ | 29.78 | 37.12 | 37.95 | 1114784 | -0.41 |
| | ABME_$H_{20}$ | 29.72 | 37.08 | 37.92 | 1114864 | -0.47 |
| | ABME_$H_{25}$ | 29.82 | 37.06 | 37.87 | 1114792 | -0.37 |
| | ABME_$H_{30}$ | 29.81 | 37.16 | 38.14 | 1114928 | -0.38 |
| Akiyo (112kbps, CIF) | FS | 40.77 | 44.06 | 45.16 | 1115760 | |
| | ABME_$H_A$ | 40.72 | 43.98 | 45.01 | 1115872 | -0.05 |
| | ABME_$H_B$ | 40.73 | 44.00 | 45.08 | 1115992 | -0.04 |
| | ABME_$H_C$ | 40.74 | 44.08 | 45.15 | 1115808 | -0.03 |
| | ABME_$H_{20}$ | 40.74 | 44.02 | 45.11 | 1115600 | -0.03 |
| | ABME_$H_{25}$ | 40.76 | 44.03 | 45.13 | 1115824 | -0.01 |
| | ABME_$H_{30}$ | 40.72 | 43.96 | 45.04 | 45.04129 | -0.05 |

FIG. 10

| Sequence (Target bitrate, Size) | Method | Y_PSNR (dB) | U_PSNR (dB) | V_PSNR (dB) | Total Bits | Δ Y_PSNR (dB) |
|---|---|---|---|---|---|---|
| Stefan (512kbps, CCIR601) | FS | 29.55 | 34.22 | 33.96 | 5095128 | |
| | ABME_$H_A$ | 29.36 | 34.33 | 34.03 | 5095072 | -0.19 |
| | ABME_$H_B$ | 29.45 | 34.40 | 34.11 | 5095440 | -0.10 |
| | ABME_$H_C$ | 29.46 | 34.39 | 34.10 | 5095344 | -0.09 |
| | ABME_$H_{20}$ | 29.42 | 34.37 | 34.10 | 5095344 | -0.13 |
| | ABME_$H_{25}$ | 29.45 | 34.39 | 34.11 | 5095640 | -0.10 |
| | ABME_$H_{30}$ | 29.44 | 34.40 | 34.11 | 5095160 | -0.11 |
| Table Tennis (2Mbps, CCIR601) | FS | 34.65 | 39.60 | 39.86 | 19901976 | |
| | ABME_$H_A$ | 34.28 | 39.53 | 39.74 | 19901784 | -0.37 |
| | ABME_$H_B$ | 34.49 | 39.63 | 39.90 | 19901688 | -0.16 |
| | ABME_$H_C$ | 34.50 | 39.64 | 39.91 | 19901680 | -0.15 |

FIG. 10 (Continued)

| Search Ranges | Methods | Complexity | | Bus Bandwidth | |
|---|---|---|---|---|---|
| | | Operations / Macroblock | Speedup | Mbytes / sec | Ratio |
| 16 | FS | 196608 | 1 | 12.39 | 100 % |
| | ABME_$H_A$ | 4819 | 40.80 | 1.26 | 10.17 % |
| | ABME_$H_A$_HW | 1599 | 122.96 | 1.27 | 10.25 % |
| 32 | FS | 786432 | 1 | 20.04 | 100 % |
| | ABME_$H_A$ | 7459 | 105.43 | 1.32 | 6.60 % |
| | ABME_$H_A$_HW | 1607 | 489.38 | 1.34 | 6.67% |
| 64 | FS | 3145728 | 1 | 38.50 | 100 % |
| | ABME_$H_A$ | 18499 | 170.05 | 1.47 | 3.82 % |
| | ABME_$H_A$_HW | 1623 | 1938.22 | 1.50 | 3.90 % |

FIG. 11

METHOD AND APPARATUS FOR MOTION ESTIMATION WITH ALL BINARY REPRESENTATION

FIELD OF THE INVENTION

The present invention generally relates to motion estimation for video encoding, and more specifically to motion estimation based on a pyramid structure with all binary representation for video encoding.

BACKGROUND OF THE INVENTION

In a multimedia embedded system, the video encoding module contains several major components including DCT (Discrete Cosine Transform)/IDCT (Inverse DCT), motion estimation (ME), motion compensation, quantization, inverse quantization, bit rate control and VLC (Variable Length Coding) encoding, where the most computationally expensive part is the motion estimation. Generally the motion estimation takes around 50% of the total computational power for an optimized system. Thus, to further optimize motion estimation is critical in cost reduction for real-time video encoding in an embedded multimedia system.

Many fast search algorithms have been developed including the three-step search, the 2-D logarithmic search, the conjugate directional search, the genetic search, the diamond search, the feature-based block motion estimation using integral projection, and sub-sampled motion field estimation with alternating pixel-decimation patterns. These various search approaches reduce the complexity at the expense of motion vector accuracy, which leads to a selection of only local minimum of mean absolute difference (MAD) as compared to global minimum of a conventional full search algorithm.

Conventional multi-resolution motion estimation techniques perform the search with a much smaller window from lower to higher resolution layers. The motion vectors are refined gradually at each layer but the search area is equivalent to that of the full search with much lower complexity. To further reduce the complexity, the conventional binary motion estimation algorithms significantly decrease both the computational complexity and bus bandwidth by reducing the bit depth. Based on a binary pyramid structure, Song, et. al., disclose a fast binary motion estimation algorithm, namely fast binary pyramid motion estimation (FBPME), in "New fast binary pyramid motion estimation for MPEG2 and HDTV encoding", *IEEE Trans. on Circuits and Systems for Video Technology*, vol. 10, no. 7, pp. 1015–1028, October 2000. The pyramidal structure of FBPME contains one integer layer at the lowest resolution (smallest picture size) and three binary layers that contain detail information. FBPME performs the tiled motion search with XOR (Exclusive OR) Boolean block matching criterion on binary layers and MAD on the integer layer. The block matching uses XOR operations that are much simpler and faster to implement than MAD operations.

However, the FBPME structure uses an integer layer, which leads to two distortion computation modules to perform both MAD and XOR operations. It requires bigger code size and more hardware complexity. The FBPME structure also needs more complicated pre-processing including filtering, decimation, binarization and interpolation. The hardware complexity for both MAD and XOR operations and more complicated pre-processing in the multi-layer approach result in more power consumption for hardware implementation.

Another conventional fast binary motion estimation algorithm presented by Natarajan, Bhaskaran, and Konstantinides is based on a simple one-bit transform with conventional search schemes. It provides single layer motion estimation that derives the current and reference blocks. However, the binary representation does not use any hierarchical structure. When a hierarchical structure is adopted, it is more challenging to get an accurate binary representation at a lower resolution.

SUMMARY OF THE INVENTION

This invention has been made to overcome the above-mentioned drawbacks of conventional motion estimation. The primary object is to provide a method for motion estimation with all binary representation for video coding. Accordingly, a binary pyramid having three binary layers of video images is constructed. The first binary layer is first searched with a criterion based on bit-wise sum of difference to find a first level motion vector. Six motion vector candidates are used to determine a motion vector in the second binary layer. Finally, a search in the third binary layer according to the second layer motion vector generates a final motion vector.

In the present invention, the construction of the binary pyramid includes filtering, binarization and decimation. The precise edge information is extracted based on the spatial variation within a small local area of an image to provide all binary edge information without having to use any integer layer. In the first level search, the search is performed within a ±3 pixel refinement window. In the second level search, this invention calculates the ranges of two dimensional 8×8 motion offsets ($[R_{min}^x, R_{max}^x]$, $[R_{min}^y, R_{max}^y]$) through the six motion vector candidates from the current and previous frames according to the spatial-temporal dependencies that exist among blocks. The refinement window in the second level has thus covered the dominant ranges of the search area with dimension $(R_{max}^x - R_{min}^x + 1) \times (R_{max}^y - R_{min}^y + 1)$ around the mean vector of the six motion vectors. The invention then performs the full-search XOR Boolean block matching with $(R_{max}^x - R_{min}^x + 1) \times (R_{max}^y - R_{min}^y + 1)$ pixels for refinement at the second level. Similarly, the resultant motion vector candidate will be passed onto the next binary level. In the third level, the search is performed within a ±2 pixel refinement window. At each level, the search and determination of the best motion vector is based on a criterion of minimum bit-wise sum of difference using XOR block matching.

It is also an object of the invention to provide an apparatus for motion estimation for video encoding. Accordingly, the apparatus comprises a binary pyramid construction module, a first level search module, a second level search module, and a third level search module. Each level search module includes a data loading module, a bit alignment module, and an XOR block matching module. The binary pyramid construction structure further comprises a filtering module, a binarization module and a decimation module. Each XOR block matching module further includes a table lookup sub-module and a bit-wise sum of difference (SoD) sub-module.

The motion estimation of this invention is feasible for pipelined architectures. The method of motion estimation can be implemented in various architectures including general-purpose architectures such as x86, single instruction multiple data (SIMD) architectures using Intel's MMX technology, and systolic arrays. The pipelined architecture of the invention contains three major common modules including the integrated construction, compact storage, and parallel block matching.

The invention uses a MPEG-4 reference video encoder and employs a macroblock with size 16×16 for block matching to show the performances. According to the experimental results, it not only has the benefits of low computational complexity and low memory bandwidth consumption but also is insensitive to search range increase. System designer can choose better binarization methods to further improve the visual quality. In addition, various optimization methods can be developed for specific platforms with different register size. The invention thus is more flexible than other motion estimation method. From the operation counts, the motion estimation of this invention is very desirable for software implementation on a general-purpose processor system. It can be realized by a parallel-pipelined implementation for ASIC design and allows tradeoffs between silicon area, power consumption and visual quality during the hardware design phase.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 6 illustrates a parallel processing of the binarization process.

FIG. 10 illustrates the computational complexities and bus bandwidths for full search, the motion estimation with and without hardware acceleration according to this invention.

FIG. 11 illustrates the performance comparison of the motion estimation according to this invention vs. full search based on the various encoding conditions, filters, and visual quality in PSNR.

DETAILED DESCRIPTION OF THE PREFERRED EMBODIMENTS

The all binary motion estimation of the invention basically comprises a multi-level binary pyramid structure and multiple search modules. To achieve a tradeoff between the precision of the estimated motion vectors and the computational complexity, the preferred embodiment of this invention includes a three-level pyramid for motion estimation. In the following parts of the description, the levels are denoted as level 1, level 2, and level 3, respectively.

Figure 1A:
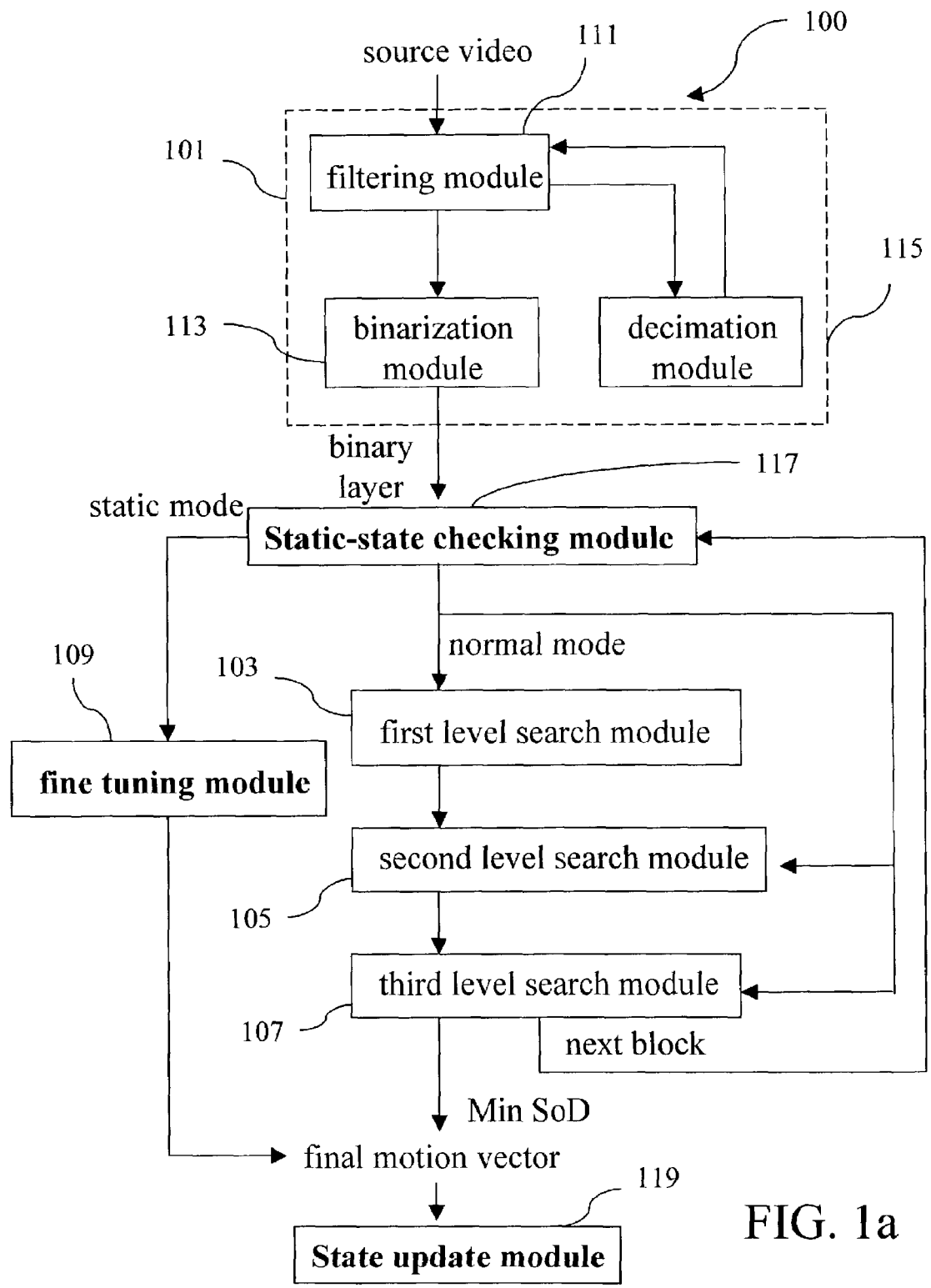
FIG. 1a shows a block diagram of the three-level binary pyramid structure for motion estimation according to this invention.
Figure 2:
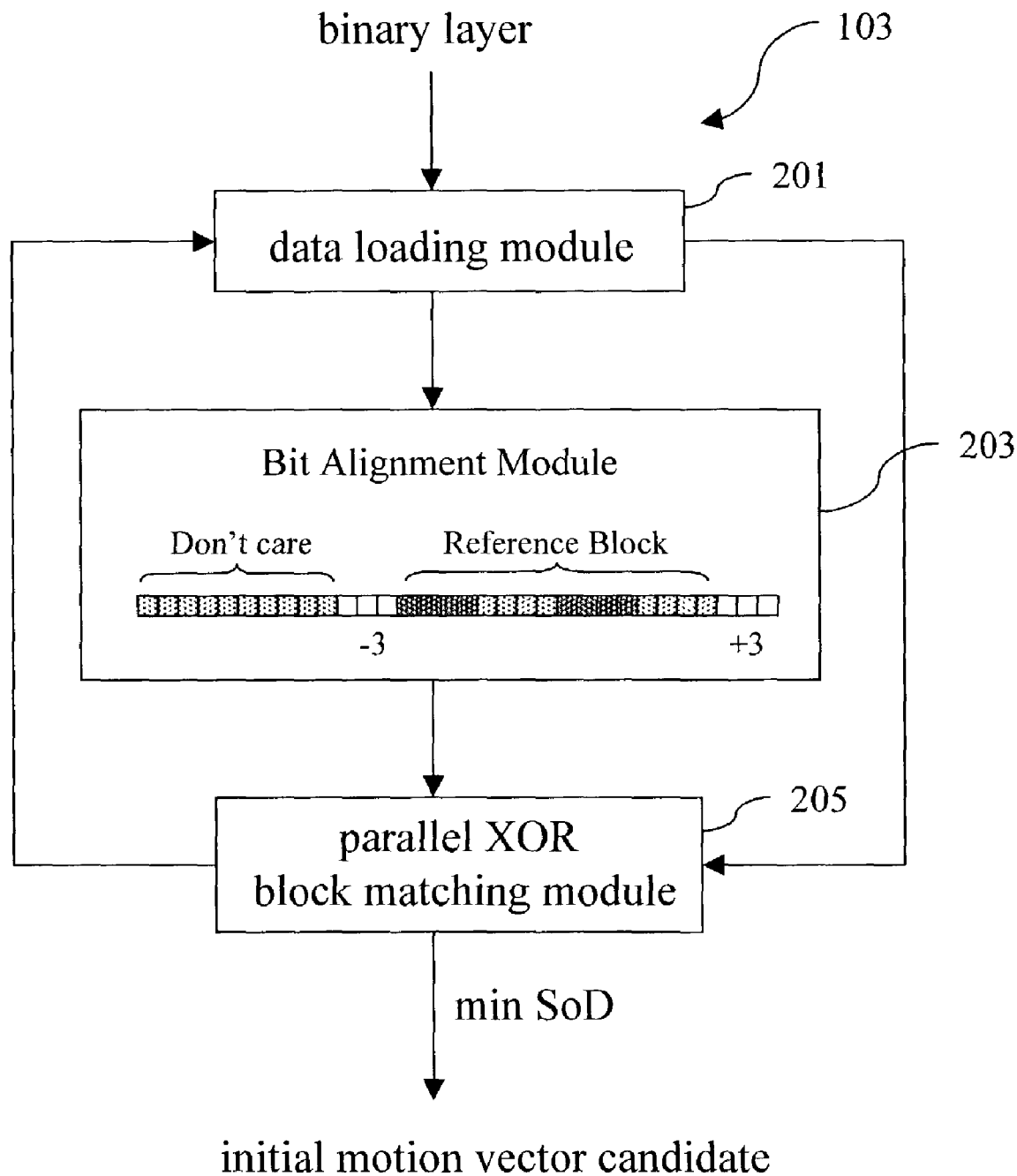
FIG. 2 shows the first level search module for the motion estimation illustrated FIG. 1.
Figure 3:
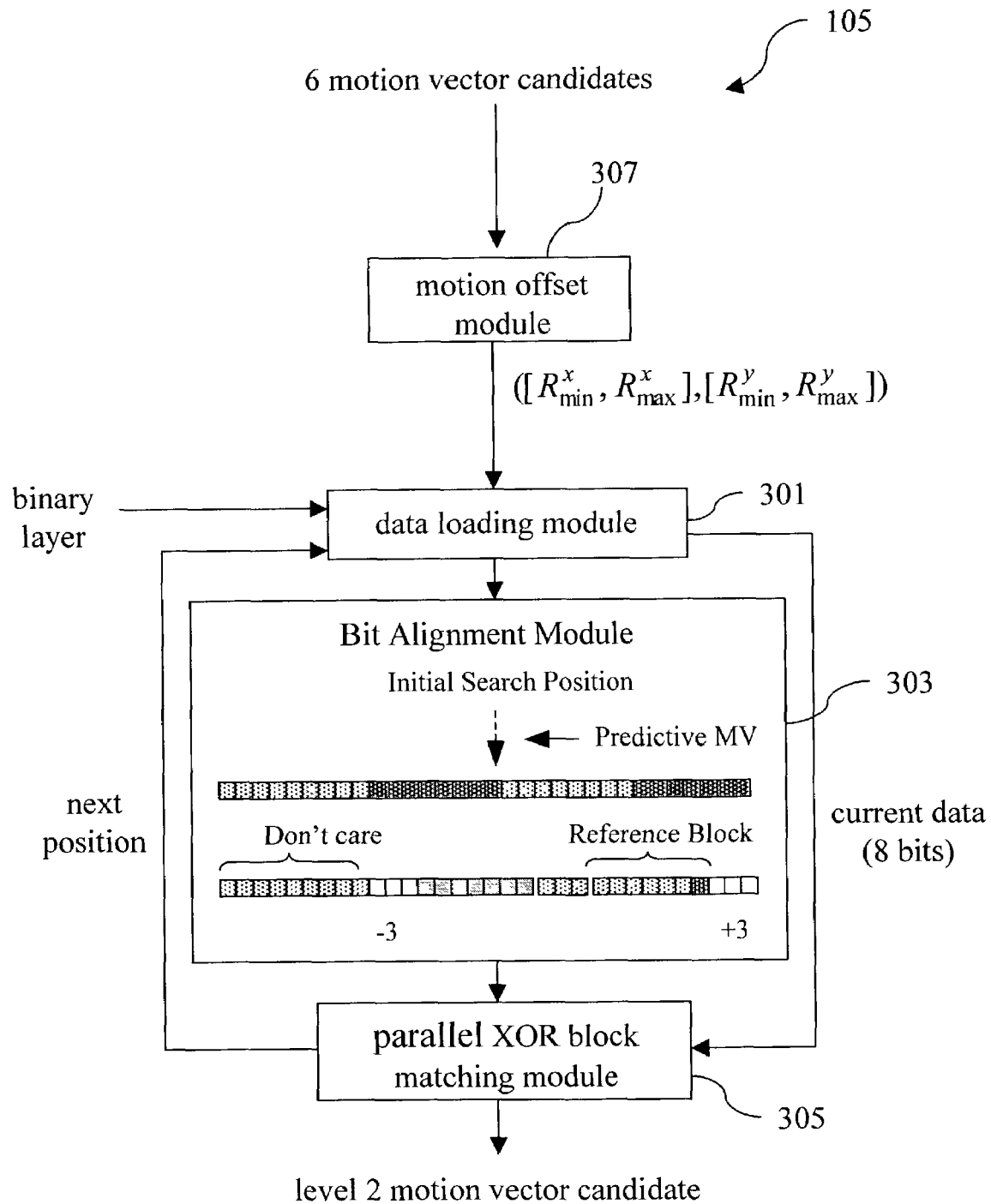
FIG. 3 shows the second level search module for the motion estimation illustrated FIG. 1.

FIG. 1a shows a block diagram of the three-level binary pyramid structure for motion estimation according to this invention. The apparatus for motion estimation of FIG. 1 comprises a binary pyramid structure 101, a first level search module 103, a second level search module 105, a third level search module 107, a fine tuning module 109, a static-state checking module 117, and a state update module 119. Each level search module includes a data loading module, a bit alignment module, and an XOR block matching module. The binary pyramid structure 101 further comprises a filtering module 111, a binarization module 113 and a decimation module 115. Using simple decimation, the block sizes used in the XOR block matching at the three levels are 4×4, 8×8 and 16×16. In the fine tuning module, the motion search is skipped and the block size used in the XOR block matching is 16×16. FIGS. 2–4 illustrate the first, the second and the third level search modules respectively.

Figure 1B:
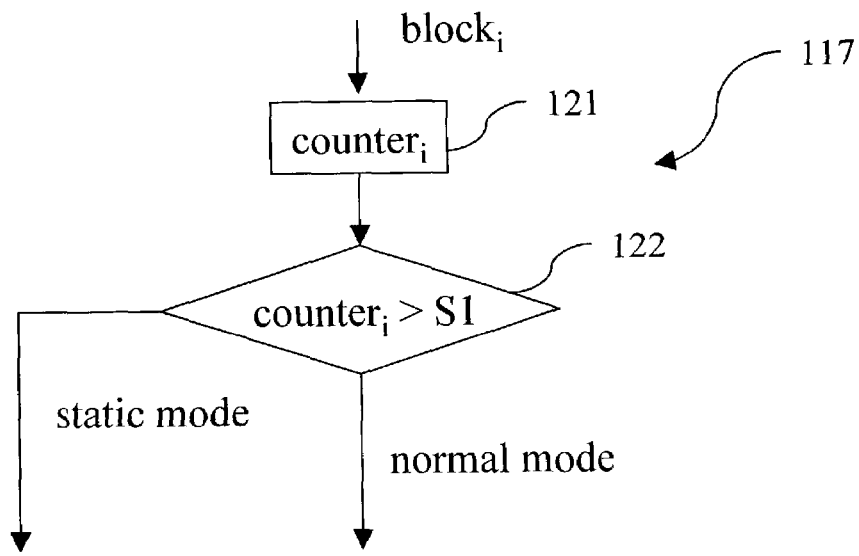
FIG. 1b illustrates the static-state checking module for motion estimation according to this invention.
Figure 1C:
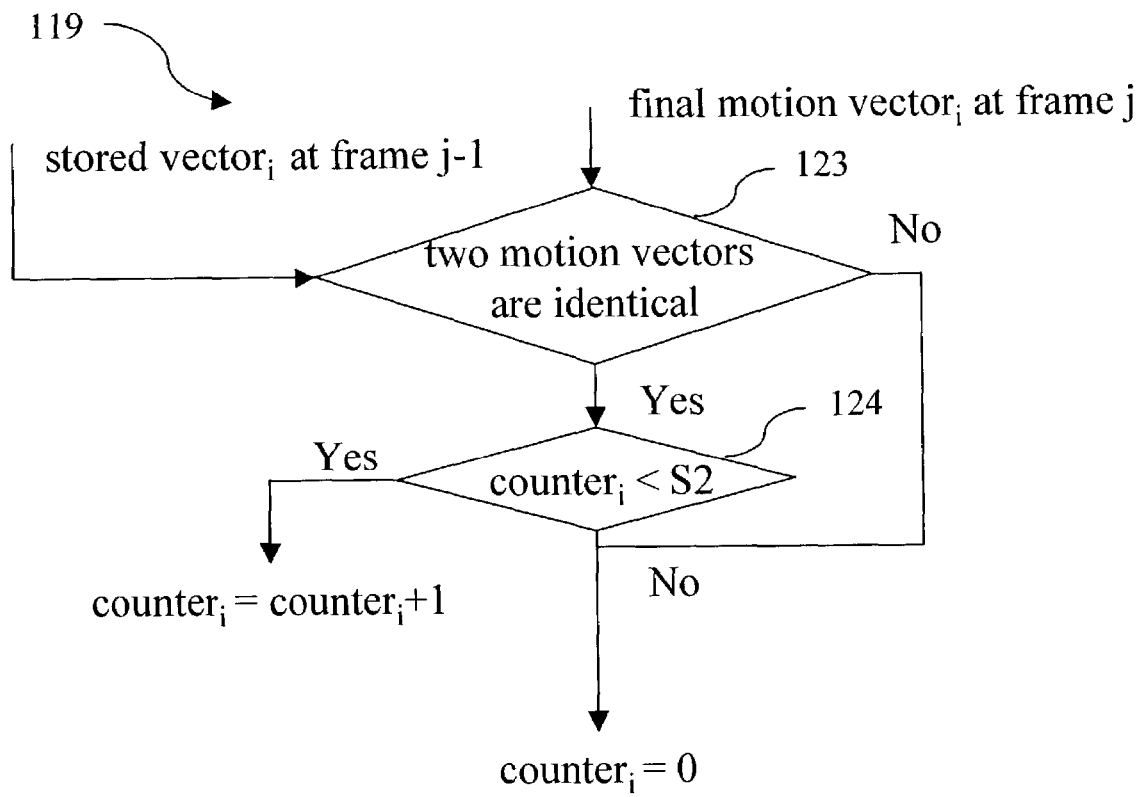
FIG. 1c illustrates the state update module for motion estimation according to this invention.

Referring to FIGS. 1b and 1c, in the static-state checking module and the state updating module, there is one counter 121 and three comparators 122, 123, 124. Initially, the counters for all blocks are set to zero when processing the first frame in the source video. Two constants S1 and S2 (S2>S1>2) are used to control the occurrence of the static mode and to retain the video quality. To process each block i, the comparator 122 in the static-state checking module checks if the content of the counter, is larger than S1. If it is true, the motion search enters the static state and fine tunes the motion vector within a range of ±1 in the fine tuning module. Otherwise, the motion search goes through the normal state and proceeds to the three level binary search. After motion estimation, in the state updating module, the comparator 123 checks if the final motion vector of each block i in the current frame j equals to the stored motion vector of the block i in the previous frame j−1, whose coordinates are identical to the current block. If the two motion vectors are the same, the comparator 124 checks if the content of the counter, 121 is less than S2. If it is less than S2, the counter, 121 is increased by one. Otherwise, the counter$_i$ 121 is reset to zero. The same steps are applied to every block in the current frame. It should be noted that the same counter$_i$ 121 is used in FIGS. 1b and 1c.

To further reduce the computational complexity, an optional counter can be used to register the repeat occurrence of motion vector for each macroblock. If the motion vectors remain identical for the past four frames, the invention assumes the current macroblock is static and skips the motion search and only makes a refinement within a smaller search range of ±1 by the fine tuning module 109 in FIG. 1a. With all binary representation, XOR operation, and smaller search window, the speed of the motion estimation can be improved with only minor loss of the reconstructed image quality.

Referring to FIG. 2, the first level search module includes a data loading module 201, a bit alignment module 203, and a parallel XOR block matching module 205. The bit alignment module 203 has a ±3 pixel refinement window. With reference to FIG. 3, the second level search module 105 also includes a data loading module 301, a bit alignment module 303, a parallel XOR block matching module 305, and a motion offset module 307.

Referring to the motion offset module 307 in FIG. 3, before entering the fine tune search of level 2, with six motion vector candidates estimated from the first level search and from the previous frame, the motion offset module calculates the ranges ($[R_{min}^x, R_{max}^x]$, $[R_{min}^y, R_{max}^y]$) of two dimensional motion offsets for every 8×8 block. Based on the derived motion offsets, the bit alignment module 303 has a ($[R_{min}^x, R_{max}^x]$, $[R_{min}^y, R_{max}^y]$) pixel refinement window.

Figure 4A:
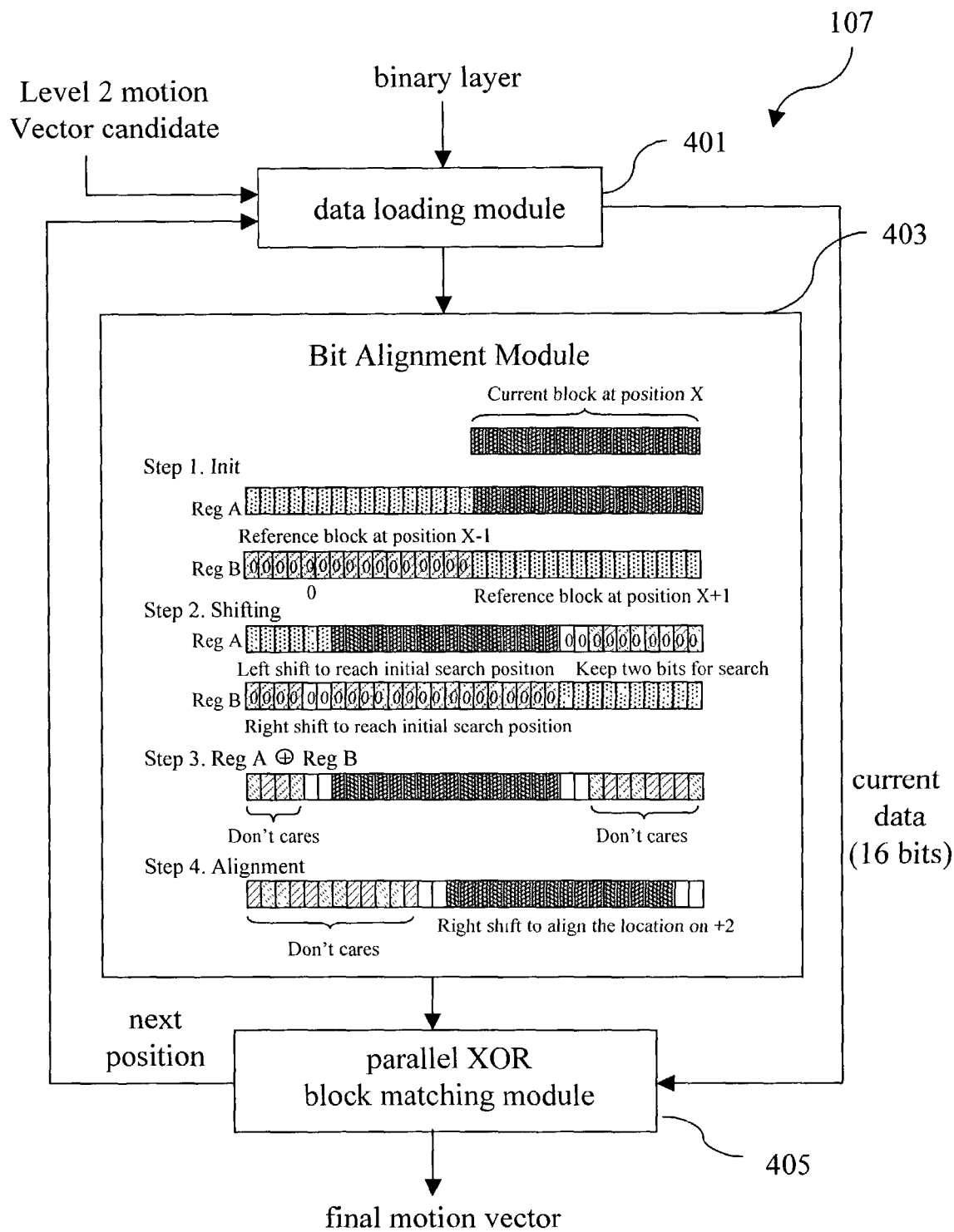
FIG. 4a shows the third level search module for the motion estimation illustrated FIG. 1.
Figure 4B:
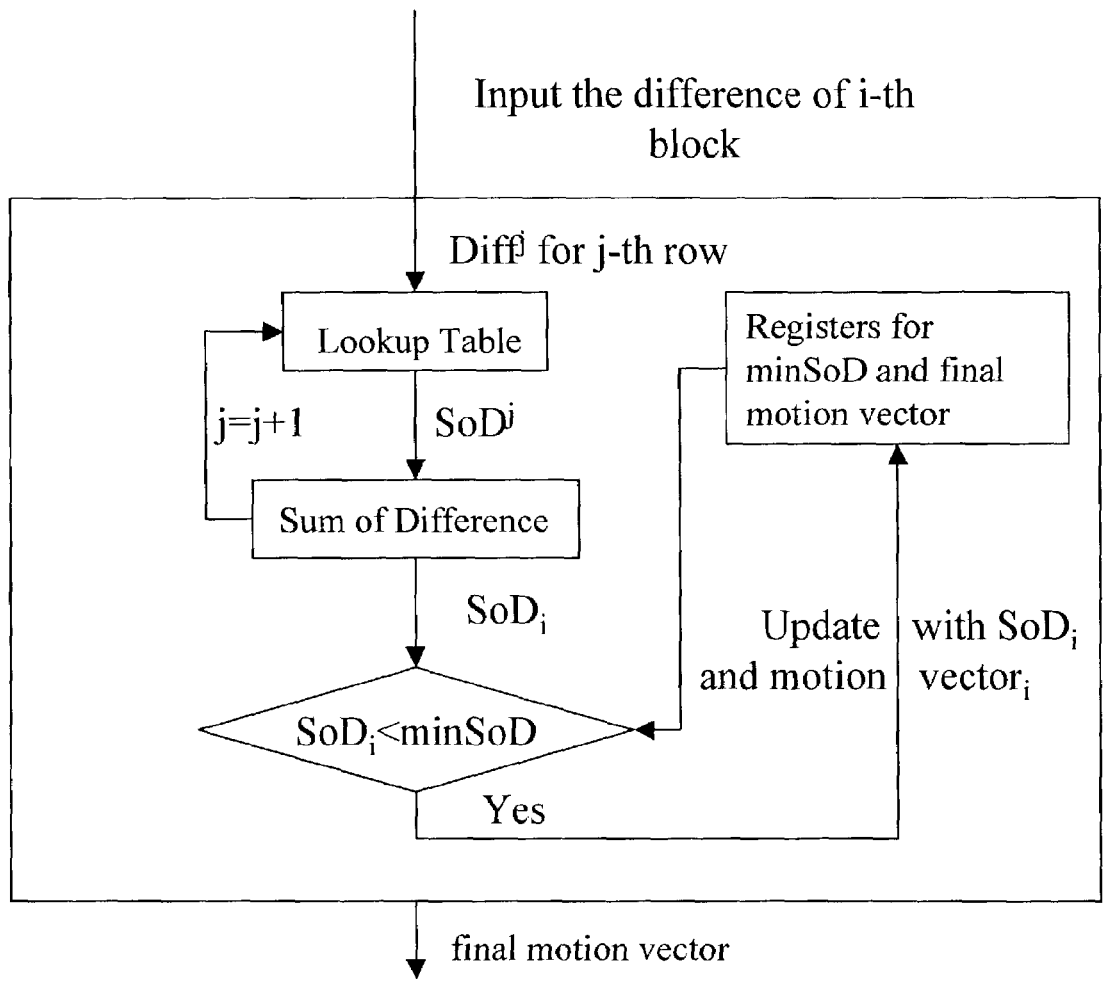
FIG. 4b shows that an XOR block matching module according to the invention comprises a table lookup sub-module and a bit-wise sum of difference (SoD) sub-module.

Referring to FIG. 4a, the third level search module includes a data loading module 401, a bit alignment module 403, and a parallel XOR block matching module 405. Each of the parallel XOR block matching modules 205, 305 and 405 of FIGS. 2–4 further includes a table lookup sub-module and a bit-wise sum of difference (SoD) sub-module as shown in FIG. 4b. The method of motion estimation implemented in the apparatus shown in FIG. 1 comprises four major steps. The first step is to construct the multi-level binary pyramid structure. The second step is to perform full search XOR Boolean block matching with a ±3 pixel refinement window. The third step is to calculates the ranges ($[R_{min}^x, R_{max}^x]$, $[R_{min}^y, R_{max}^y]$) of two dimensional motion offsets for every 8×8 block with the six motion vectors candidates from the previous and current frames and perform XOR Boolean block matching within specified area for refinement at the second level. The fourth step is to perform full search XOR Boolean block matching with a ±2 pixel refinement window at the last level.

In the first step, three sub-steps including filtering, binarization and decimation are performed by the filtering module 111, binarization module 113 and the decimation module 115 respectively to build the three-level pyramid structure. Each original pixel is compared to a threshold, which is computed from an average of the neighboring luminance pixels, to derive the binary representation. At the decimation stage, the filtered image is then sub-sampled by 2 in each dimension of the image to achieve the next layer iteratively.

Figure 5:
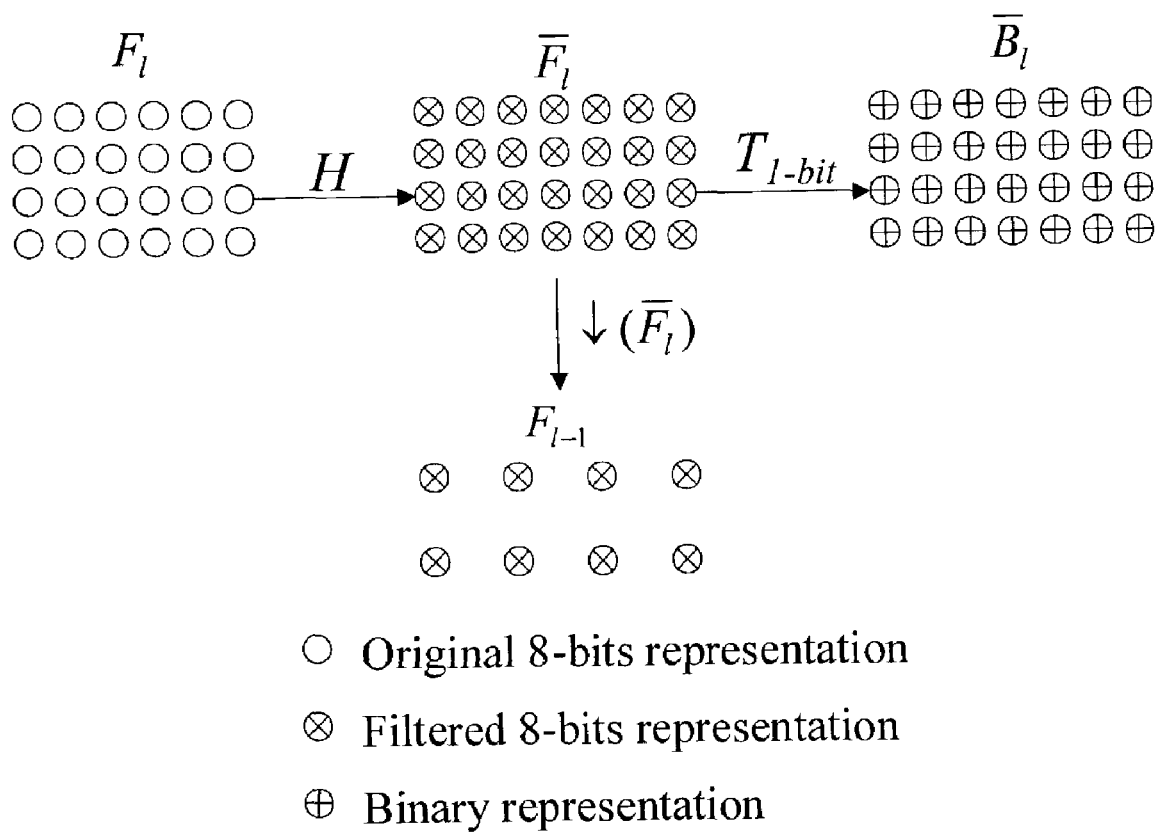
FIG. 5 illustrates the construction of each binary layer according to the invention.

During the construction of the binary pyramid structure, the precise edge information is extracted based on the spatial variations within a small local area of an image. In the invention, the design of the filtering module provides all binary edge information without having to use any integer layer that is needed in FBPME. The spatial variations can be extracted with various filters. Assume that an 8-bit representation of the current frame, F, is low-pass filtered to create a new frame $\overline{F}_l$. In other words, $$F_L = F,$$

$$\overline{F}_l = H(F_l),$$

with l=1 . . . L, where L is the total number of pyramidal levels used. In the invention, L is set to 3. The frame $\overline{F}_l$ is a blurred version of the original frame $F_l$ with the same size at the l-th level. The construction of each pyramidal level in binary format is illustrated in FIG. 5.

The filtered frame $\overline{F}_l$ is then used to create the binary representation of the current frame. The construction of the binary representation is based on a threshold $T_b$. The threshold is defined to precisely represent the edge information in binary format. The edge information can be found by differencing the original image and its lowpass version. To compute the binary representation, the invention adopts a novel differencing operation using a specified threshold as computed from frame $\overline{F}_l$, which provides the average spatial variations for the neighboring area. Thus, the binary representation of the l-th level is computed by the following one-bit transformation:

$$S_l(x, y) = T_{1-bit}(F_l, \overline{F}_l) = \begin{cases} 1 & \text{if } (F_l(x, y) \geq T_b = \overline{F}_l(x, y)) \\ 0 & \text{otherwise} \end{cases}.$$

In the last process of decimation, the lowpass frame $\overline{F}_l$, which contains most of the spatial information from the original image at the current level, is used to create the input frame in the next pyramidal level. To compute the next level, the frame $\overline{F}_l$ is decimated every other pixel to yield the new frame $F_{l-1}$ as described in the following equation:

$$F_{l-1} = \downarrow(\overline{F}_l).$$

In the second step, the full search XOR Boolean block matching with a ±3 pixel refinement window is performed at the first level search module 103 to locate one initial motion vector candidate with a block size of 4×4. The initial motion vector candidate is projected to the next binary level which has a block size of 8×8.

The matching criterion of this invention is bit-wise sum of difference (SoD):

$$SoD(u, v) = \sum_{(x,y) \in Block} [S_{l,t}(x, y) \oplus S_{l,t-1}(x + u, y + v)]$$

where $S_{l,t}(x, y)$ denotes the current binary block at the l-th level and $S_{l,t-1}(x+u, y+v)$ denotes the reference binary block with offset (u, v) from the left top corner of the current block. Because the frame data are in all binary formats, a simple XOR operation is used to compute the difference.

This invention performs the full search at the first level with a search range of ±3 instead of a search range of ±16 ($R_{Lv1} = R/4 - 1$), where R is the target search range. With a smaller window, motion vectors covering 16 times of the actual search area are still obtained.

In the third step, based on the spatial-temporal dependencies that exist among blocks, this invention selects the best 8×8 motion vector from six candidates in the current and previous frames using XOR matching criterion mentioned above. The six motion vector candidates are motion vectors corresponding to the upper right (UR), upper (U), and left (L), initial motion vector candidate of level 1, a motion vector of temporally previous (P) blocks and the center (C). The center candidate means a zero motion vector.

According to the invention, the minimum and maximum offsets of the six candidates for each dimension are selected as the boundaries of the refinement window in the second level by the motion offset module 307 shown in FIG. 3. Thus, the motion offset module 307 defines the ranges ($[R_{min}^x, R_{max}^x]$, $[R_{min}^y, R_{max}^y]$) of two dimensional motion offsets for every 8×8 block. The refinement window in the second level has covered the dominant ranges of the search area with size $(R_{max}^x - R_{min}^x + 1) \times (R_{max}^y - R_{min}^y + 1)$ around the mean vector of the six motion vectors. We then perform the full-search XOR Boolean block matching with a $(R_{max}^x - R_{min}^x + 1) \times (R_{max}^y - R_{min}^y + 1)$ pixel window for refinement at the second level. Similarly, the resultant motion vector candidate is passed onto level 3 for further refinement within a search range of ±2.

In the fourth step, a ±2 search window refined search is used to derive the final motion vector for a block size of 16×16. In the present invention, the final motion vector accuracy is affected by the efficiency of the binarization process in the first step. The threshold $T_b$ use in the binarization process depends on the average spatial characteristics and the edge information retained after the filtering process. A low pass filter with a higher cutoff frequency removes less amount of the average spatial variation and retains more high frequency components in the binary representation $S_{l,t}(x, y)$ as shown above. Additional high frequency information retained may increase the precision of the all binary edge information. For practical implementation, a trade-off needs to be made between the coding efficiency and the complexity of the filter.

To demonstrate that the motion estimation of the invention is suitable for pipelined architecture, specific implementations are investigated to achieve pipelined processing for various architectures which include general-purpose architectures such as x86, SIMD architectures using Intel's MMX technology, and systolic arrays. For simplicity, in all implementations described below the filter used in the filtering module 111 is:

$$H_A = \frac{1}{4}\begin{bmatrix} 0 & 1 & 0 \\ 1 & 0 & 1 \\ 0 & 1 & 0 \end{bmatrix}.$$

To verify the effectiveness of the approach in the present invention over the full search approach, this invention uses the x86 system and C language for simulations. Since the initial locations and the storage units of each level are distinct, the speedup of the block matching is accomplished level by level with the disclosed method in the invention. The level-by-level implementation allows low memory bandwidth consumption with frequent data access for block matching.

The pipelined architecture of the invention comprises three major common modules including the integrated construction, compact storage, and parallel block matching. For each module, the size and type of storage are constrained by the data bins/registers defined in the individual architecture, which provides various distinct sizes of data storage devices/registers. To implement each generic module in an x86 system, the use of C language provides three basic data bins including INT (32 bits), SINT (16 bits), and UCHAR (8 bits). In the Intel SIMD architecture using MMX technology, the largest data bin is a register of 64-bit MMX for every module. Unless larger data bin is available, the optimization processes for this kind of architecture are similar to that of x86 architectures. For further reductions in memory bandwidth between the processing units and reductions in operation counts on both architectures, the use of the largest data bin is preferable to store the binary representation of several consecutive blocks in a packed way.

The first module, integrated construction of the 3-level binary pyramid, consists of three processes including filtering, binarization and decimation. This module can be enhanced in two sub-modules including the boundary partitioning and parallel processing. The boundary partitioning is used to skip the branching decision on whether the current data is located at the frame boundaries. The first sub-module, boundary partitioning, is achieved by classifying the frame into the nine regions: four corners, two boundary rows and two boundary columns, and the interior. The second sub-module, parallel processing, is achieved by loading multiple sets of pixels that are sequentially stored in registers with a larger size. FIG. 6 shows an example of using the filter $H_A$ to construct the lowpass frame $\overline{F}_l$. The pixel $F_l(x, y)$ indicates the pixel at the coordinates (x, y) within the processing frame of the l-th pyramid level. The shadowed circle represents the current pixel to be binarized. The derivation of the lowpass frame using the filter $H_A$ is equivalent to the computation of the average value of the neighboring pixels surrounding the check point with a distance of one.

Assume the frame data are stored in the data bin, named as SINT, under C/C++ environment in x86 system. FIG. 6 also demonstrates an example of processing the pair ($[F_l(0, 1) \; F_l(1, 1)]_{32}$. This invention first loads four neighboring pairs, $([F_l(1, 0) \; F_l(0, 0)])_{32}$, $([F_l(1, 2) \; F_l(0, 2)])_{32}$, $([F_l(0, 1) \; 0])_{32}$ and $([F_l(2, 1) \; F_l(1, 1)])_{32}$, from the reference frame into four 32-bit INT registers, $(R_1)_{32}$, $(R_2)_{32}$, $(R_3)_{32}$, and $(R_4)_{32}$. After loading, the summation and rounding operations can be performed directly since no overflow or underflow occurs for the frame data. This is because only 8-bit wide data are stored in a 16-bit data bin. After summation and loading, the results are put back to a 32-bit INT register $(R)_{32}$:

$$(R)_{32} = (R_1)_{32} + (R_2)_{32} + (R_3)_{32} + (R_4)_{32} + 0x00040004$$
$$= ([F_l(1,0) + F_l(1,2) + F_l(0,1) + F_l(2,1)]$$
$$[F_l(0,0) + F_l(0,2) + 0 + F_l(1,1)])_{32} + 0x00040004,$$

where the value 0x00040004 is used for the rounding purpose of the concurrently processed pixels. The threshold for each pixel can be derived by extracting the pair of the values inside the register $(R)_{32}$, $(R_{LSB} >> 2)_{16} = ((R)_{32} >> 2) \& 0x3FFF$ $(R_{USB} >> 2)_{16} = (R)_{32} >> (2+16)$ where '>>' means the logical SHIFT RIGHT operation. The derived threshold is used for binarization. With this optimization, the construction stage has about 30% improvement in speed.

If a larger bin is available, the speed can be increased by a factor that equals to the number of the pixels that can be simultaneously loaded into a single bin. In the Intel SIMD architecture using MMX technology, the binary pyramid can be similarly constructed with the boundary partitioning and parallel processing as described previously for x86 architectures. However, the achievable parallelism based on MMX technology is almost doubled due to the 64-bit architecture. Based on the two equations just shown above, the improvement is 63% in speed.

The binary representation of frame data results in desirable compact storage for the pyramid layers. At level 1, each row of a 4×4 block only occupies four bits. Hence, one data bin with 4α bits can store the same row for several sequential α blocks. At level 2, a continuous and sequential search range of size $(R_{max}^x - R_{min}^x + 1) \times (R_{max}^y - R_{min}^y + 1)$ is defined based on the six candidates. The packing of multiple blocks into a single bin as the blocks of level 1 is adopted in the second level search. Thus for both computer architectures, this invention stores every row of the successive α8×8 blocks at level 2 into a single data bin of size 8α. Using the same concept of level 1, the invention packs every row of the successive α16×16 blocks at level 3 into a single data bin of size 16α. Note that the widest data bin in both architectures is only used for speedup of block matching.

The block diagrams for the fast block matching using all binary edge information are illustrated in FIGS. 2–4 including loading, bit alignment, and parallel XOR block matching. The loading module puts each group of sequential bits into the corresponding bins of a larger size for reducing memory access. Since the frame data in binary format has been compactly and sequentially stored, the memory access becomes a simple fetch instruction. Thus, the loading module loads the current data and the reference data in the search window into the on-chip memory, respectively.

As shown in FIG. 2, for each group of four sequential 4×4 blocks at level 1, this invention loads the same row of the current four blocks into a specified SINT register one by one, and puts the corresponding row of the reference blocks into an INT register one by one in x86 architecture. Thus, the four SINT registers can be used for following parallel block matching so that the speed is increased by about 4 times as compared to the block-by-block matching scheme. The same processes are employed in the Intel SIMD architecture except for the use of 64-bit data bins to handle each group of eight sequential 4×4 blocks at level 1. Thus, the four MMX registers can be used for a factor of about 8 in parallelism as compared to the block-by-block matching method.

The bit alignment module synchronizes the reference data in the search window with the current data. After bit alignment, (parallel) XOR block matching, table lookup, and SoD comparison sub-modules are adopted for finding the motion vector with the minimal SoD. The XOR operation is applied to compute the distortion. To derive the block SoD after the XOR module, a table lookup operation is applied in the table lookup sub-module by counting the number of '1's in this temporary register. Finally, by comparing all SoDs, this invention can determine which motion vector is the best for each of the four blocks separately in the SoD comparison sub-module. While going through all blocks of the current frame, the resultant motion vector with the minimal SoD is selected.

The optimization processes of motion vector search in either architecture are similar except that the 64-bit registers can handle more successive blocks simultaneously and special instructions are used to operate on the registers in SIMD architecture. Thus, only relevant steps in x86 system at each search level are described in detail to show how to achieve such parallelism. The optimization of the parallel XOR bock matching modules will be explained in detail at level 1. For the remaining levels, the relevant descriptions are skipped because of their similarities.

In level 1, because each block has the initial location assigned sequentially, the invention can simultaneously compute SoDs for four blocks in x86 architecture and derive SoDs for eight blocks with MMX technology in a row-by-row manner. The following five steps summarizes the optimization for achieving parallelism:

Step 1 (Loading): Since the invention processes four neighboring blocks of size 4×4 for the current frame simultaneously, 16-bit data is needed to compute the SoDs for each row. With the search range of ±3, the data of the reference frame that needs to be loaded into a data bin should be larger than or equal to 22 bits for parallel block matching.

Step 2 (Bit Alignment): For the initially loaded data, the invention aligns the reference block with a horizontal offset of +3 relative to the current blocks at level 1 as shown in FIG. 2. To move to the next check point, the bits of the overlapped area are reused by right shifting the bits in the register by one.

Step 3 (XOR): The row-wise matching is illustrated in FIG. 2, where each square indicates a single bit. Since the STNT contains 16 bits, only the lower 16 bits of the reference register will be compared with the current data using XOR. This XOR result is temporarily stored in another STNT register and three 4-bit SHIFT and three AND (as a mask) operations are required to get the SoDs for the four blocks respectively.

Step 4 (Table Lookup): Diff is a SFNT register that stores the corresponding SoD of the current row of the n-th block as computed by $$SoD(u, v)_n = T[Diff>>[4\times(4-n)]]\& (0000\ 0000\ 0000\ 1111].$$

The overall SoD for each block equals the sum of the SoDs for each row.

Step 5 (SoD Comparison): Comparing all SoDs, the invention can determine which motion vector is the best for each of the four blocks, respectively.

At level 2, the invention stores 2 successive blocks in a 32-bit data bin with similar packing approach used in level 1 for both architectures. For each predefined check point that is found with the motion offset module 307 of FIG. 3, the motion estimation at level 2 computes the block difference in a row-by-row manner. For the current row, the invention needs not only load the required bits within the predefined search range into the registers but also aligns the reference data by shifting the registers β bits, which are equal to the horizontal offset indicated by the current motion vector. For the consecutive check points, extra shift operations are necessary to align the reference data. The bit alignment process for the level 2 search is shown in FIG. 3.

Figure 7:
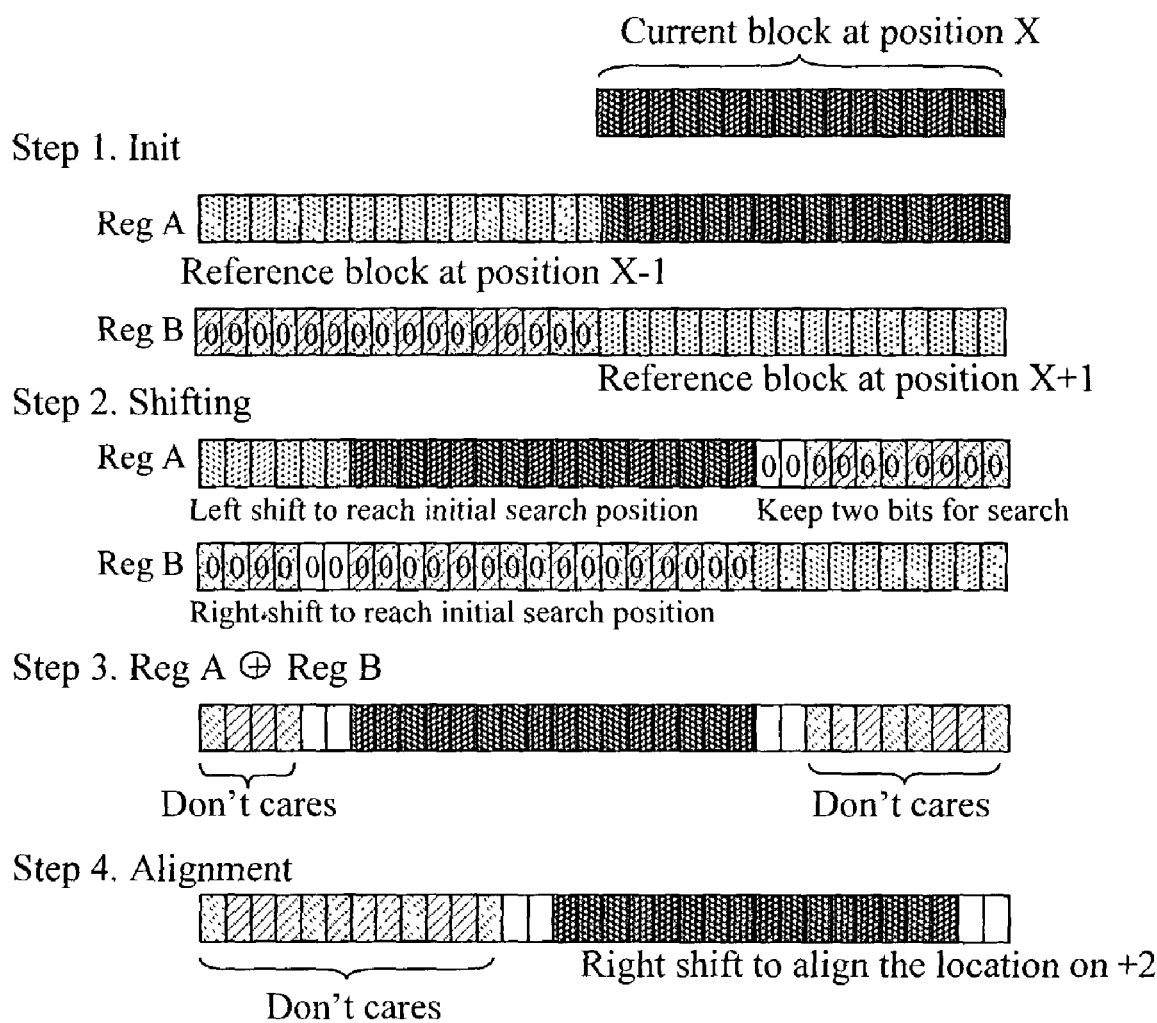
FIG. 7 illustrates the bit alignment to the initial search position for the Level 3 search.

In level 3, the modules including loading and bit alignment in x86 architecture are optimized as follows. In the loading module, one 32-bit register A stores the same row of the reference data at the block X and the previous block (X−1). The other 32-bit register B stores the same row at block (X+1). Both registers contain partial bits of reference data within the specified search window as demonstrated in FIG. 7. To align the reference data, the horizontal predictive motion vector is initially set to be −10 as an example. Register A is shifted left by 10 while register B is shifted right by 6 to reach the initial search position. The invention combines the contents of the two registers with a simple XOR/OR operation. In the last step, the reference bits are aligned to match the initial search location +2. When the invention moves to the next location in the same row, an extra shift operation is needed to synchronize the pair of data for matching.

The following describes the implementation of the invention using systolic arrays. The all-binary representation for each pyramid level reduces the storage from $N^2$ bytes to $N^2$ bits, which can be stored as groups of row or column vectors. Since the vectors are consecutively stored, the invention accesses the information efficiently through pipelining the binary information and overlapping the processing time for each matching process. Because the current block is fixed in the search process, the reference data can be accessed and propagated in the form of pipelines for an ASIC implementation. In short, it is advantageous to employ systolic arrays to design the hardware implementation for the motion estimation of the invention.

Figure 8:
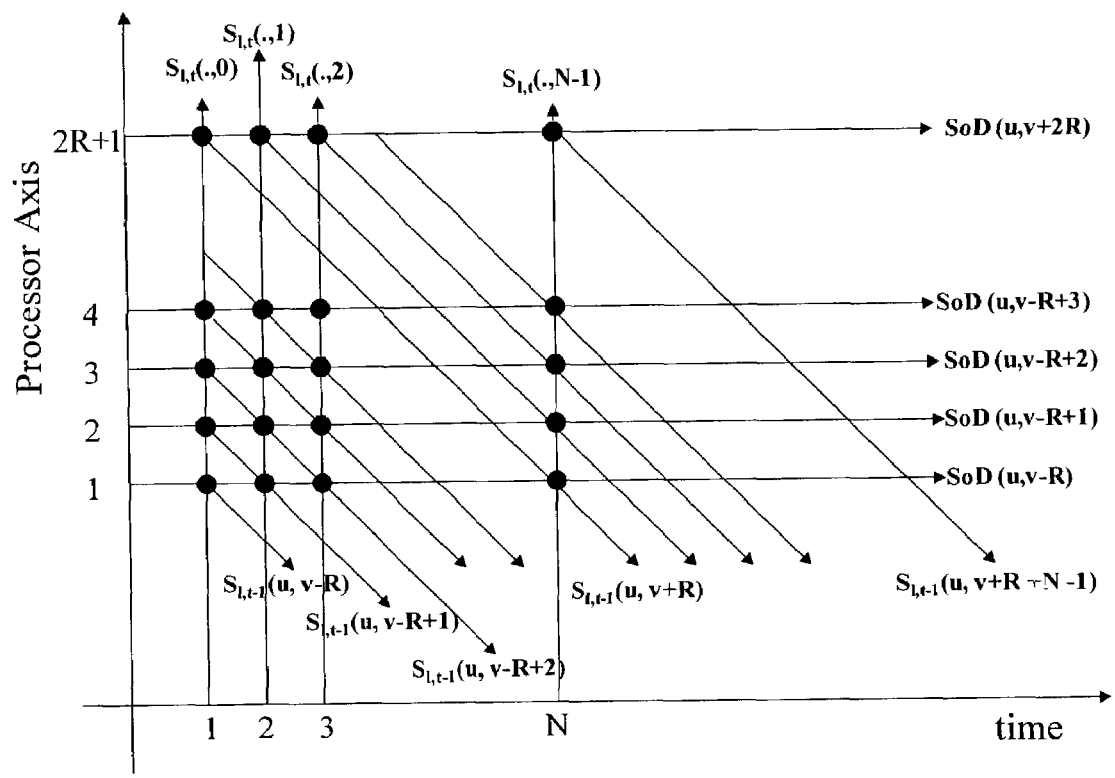
FIG. 8 illustrates the spatial-temporal representation of parallel block matching for each column of check points using systolic arrays.

In FIG. 2, FIG. 3, and FIG. 4a, the parallel XOR Block Matching module is optimized with systolic arrays for level 1, level 2, and level 3 searches. FIG. 8 illustrates the spatial-temporal representation of parallel block matching for each column of check points using systolic arrays, where each bold dot denotes a processor element and the spatial-temporal representation of the XOR block matching is defined as $$SoD(u, v) = \sum_{(x,y)\in Block} [S_{l,t}(x, y) \oplus S_{l,t-1}(x + u, y + v)].$$

$S_{l,t}(.,.)$ shown in FIG. 8 indicates the l-th level binary representation of the current frame at time t. $S_{l,t-1}(.,.)$ presents the reference data at the same pyramid level of the temporally previous frame. For block matching, the block dimension is set as N×N and the search range is ±R. The motion vector from the current block to the corresponding reference block is indicated by (u, v).

The binary data of both the current block and the reference block can be transported into the processors in the order that the resultant SoD's can be computed by summing the XOR block matching criterion in a row-by-row manner. For each block of the current or the reference frame, the binary data of each row is stored as a 1-D vector. Each pair of vectors from the current and reference blocks is delivered to the processing element (PE) for computing the SoD. The current block is further passed to the next PE through the systolic arrays. Consequently, for each column of check points, the invention obtains (2R+1) final SoDs as shown in FIG. 8.

To cover all check points of size $(2R+1)^2$, the invention computes and compares the SoDs with a pipelined approach, where each PE handles a specified row of the reference blocks at the same column within the search window. Based on the pipelined approach, the invention can process each column within the search window sequentially in time. That is, the invention checks every check point located at the first column of the search window, and selects from these check points to find the best candidate with the minimal SoD. The pipeline scans through the subsequent 2R columns using all PEs in the array, and the invention obtains the final candidate with the minimal SoD among all search points, which leads to the resultant motion vector for the current block.

The pipelined architecture requires (2R+1) PEs, (2R+N)*(2R+1) cycles, (2R+N)*(2R+1) memory access to get the reference data and N*(2R+1) memory access to load the current data from the on-chip memory to compute $(2R+1)^2$ SoDs of each block with $N^2$ bits, where additional 2R cycles are used for pipeline initialization and each memory access takes N bits of the reference block and N bits of the current block. The gate counts for constructing (2R+1) PEs are small while memory access efficiency poses the challenge.

To further reduce the latency for the memory access, the invention discloses a 2-D parallel block matching architecture using systolic arrays. The 2-D architecture removes the overhead of loading the overlapping bits within the successive reference blocks by simultaneously fetching all the $(2R+N)^2$ bits within the reference window into the on-chip memory. From each row of (2R+N) bits, the invention then de-multiplexes each group of N serial bits into the corresponding pipeline. The overall SoD for each pair of block is computed in a PE, which is implemented with detail circuits as shown in FIG. 9.

Figure 9:
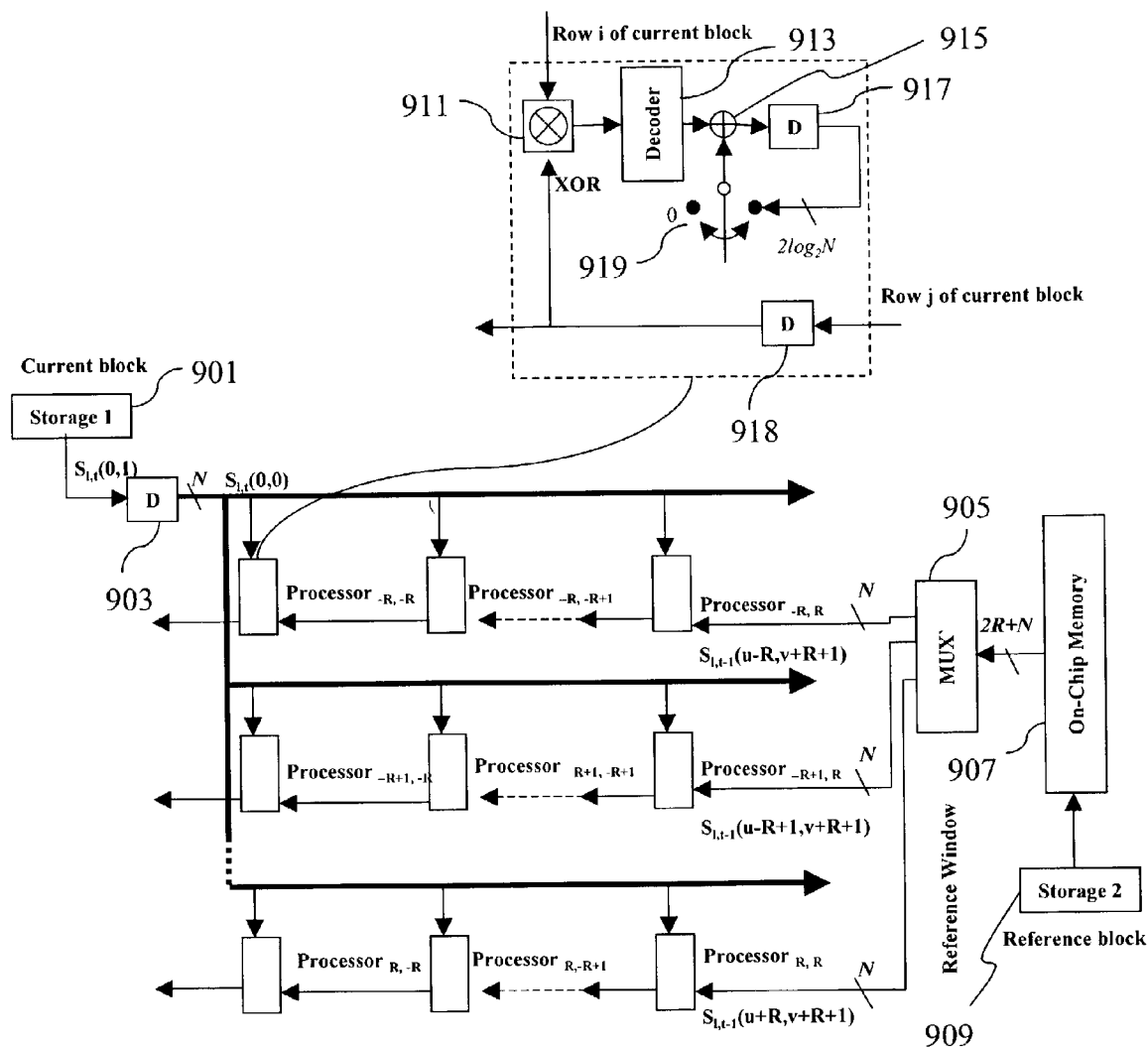
FIG. 9 illustrates the detail implementation of parallel 2-D block matching.

FIG. 9 illustrates the detail implementation of parallel 2-D block matching. The apparatus for 2-D parallel block matching of FIG. 9 comprises a storage 1 module, a delay module, $(2R+N)^2$ PEs, an MUX module, a on-chip memory module, and a storage 2 module. The storage 1 stores the binary data of the current blocks. The delay module receives the row of binary data of the current blocks and sends the row out after one clock cycle delay. The $(2R+N)^2$ PEs that are arranged as a 2-D array with (2R+N) rows by (2R+N) columns as shown in FIG. 9 receives the rows of the binary data from the current block and the reference blocks and performs XOR operations of multiple bits in parallel, computes the number of 1's using a decoder, and finally accumulates the total number of 1's as the SoD. The MUX receives the (2R+N) bits of the binary data from the reference block and distributes every N bits into each row of PEs. The (2R+N) bits received by the MUX are fetched into the on-chip memory from the storage 2.

The $(2R+N)^2$ PEs that are arranged as a 2-D array with (2R+N) rows by (2R+N) columns as shown in FIG. 9 further comprises a XOR module, a decoder module, a summation module, two delay modules, and a switch module.

A decoder 1010 is used to compute the number of '1's within each input data. Blocks with label 'D' are the delay elements. The SoD stored in the delay element of the inner loop is accumulated with all outputs from the decoder 1010. The overall SoD of concurrently matched blocks is compared by a comparator, which is not shown. The motion vector with minimal SoD is found after going through all of locations within the search areas. $S_{l,t}(.,.)$ shown in FIG. 9 indicates the l-th level binary representation of the current frame at time t. $S_{l,t-1}(.,.)$ presents the reference data within the same pyramid level of the temporally previous frame t−1. For block matching, the search range is ±R. The motion vector from the current block to the corresponding reference block is indicated by (u, v). The delay element 'D' next to the decoder 1010 stores the accumulated SoD for the corresponding position within the search area.

The PE performs XOR operations of multiple bits in parallel, computes the number of 1's using a decoder, and finally accumulates the total number of 1's as the SoD. The relationship between the PEs, the current block, and the reference block can be represented as the block diagram in FIG. 9. The dimension of the input blocks to each PE is related to the block dimension of the current pyramid level. For example, the block dimension is 4 for the level 1 and is increased to 16 for the level 3. With the 2-D parallel architecture, the invention requires $(2R+1)^2$ PEs, (2R+N) cycles, (2R+N) memory access to get the reference data and N memory access to load the current data from the on-chip memory to derive SoD for a search range of value R and each block with $N^2$ bits. Each memory access fetches (2R+N) bits of the reference block and N bits of the current block from the on-chip memory. As compared to the 1-D pipelining architecture, the speed is (2R+1) times in computation of SoDs and each reference data is fetched from the on-chip memory just once, which is the minimal memory access to load the bits into the system. Because the motion estimation of this invention requires a small search range for each level, the increase of gate count in realizing the 2-D pipelining architecture is still within a reasonable range. Although the invention provides an implementation example, it is possible to be more efficient in mapping the block diagram of the motion estimation onto a physical hardware like ASIC or FPGA chips.

FIG. 10 illustrates the computational complexities and bus bandwidths for the traditional full search ('FS'), and the motion estimation of this invention with and without hardware acceleration. The frame size is 352×288 and the frame rate is 30 fps. The following first describes the analysis of computational complexity of the motion estimation of this invention on x86 architectures with and without the alternative implementation of parallel XOR block matching module in FIGS. 2–4 using the 2-D systolic arrays. The analysis is based on how a single block computes its motion vector and the memory access per second for a particular frame rate. The notations of W, H, ±R, and $F_r$ (fps) denote the frame width, frame height, search range, and frames per second, respectively. The block size is assumed to be 16×16, which is the most commonly used in video compression standards.

For easy analysis of the complexity by the motion research with a range ([$R_{min}^x$, $R_{max}^x$], [$R_{min}^y$, $R_{max}^y$]) at level 2, the maximum motion search range is used as the worst-case scenario. The maximum motion search range of all frames is found for each dimension as in the following. For each block j within each frame i of the current sequence, the boundaries of the maximum motion search range for level 2 search are $r_{max}^x = \max \{(R_{max}^x)_{i,j}\}$, $r_{min}^x = \min \{(R_{min}^x)_{i,j}\}$, $r_{max}^y = \max \{(R_{max}^y)_{i,j}\}$, $r_{max}^y = \max \{(R_{max}^y)_{i,j}\}$, For each block, the traditional full search using sum of absolute difference (SAD) needs to process all $4R^2$ search points within search window. Each location takes $16^2 \times 3$ operations, where the three operations consist of one subtraction, one absolute value, and one addition operation for each pair of data. Hence, the computational complexity of a full search, labeled as 'FS', to obtain a single motion vector is approximated as $\delta_{FS} = 3072 \times R^2$ operations per macroblock. Based on the theoretical best-case scenario for full search using the 32-bit register in x86 system, to obtain a single motion vector is approximated as $$\overline{\delta}_{FS} = \frac{1}{4} \delta_{FS} = 768 \times R^2$$

operations per macroblock.

For the same search area, the total operations, labeled as 'ABME_$H_4$', required to compute a motion vector for the disclosed architecture without using 2-D systolic arrays are $\delta_{ABME\_H_4} = \delta_C + \delta_{Lv1} + \delta_{Lv2} + \delta_{Lv3}$ per macroblock, where ($\delta_C$, $\delta_{Lv1}$, $\delta_{Lv2}$, and $\delta_{Lv3}$ represent the operation counts for the pyramid construction and the motion search at each level of the binary pyramid, respectively. With a search window of size $4R^2$ and XOR operations for matching a macroblock of size 16×16, the search range of level 1 is reduced to $(R/2-1)^2$ and the block sizes from level 1 to level 3 are $4^2$, $8^2$, and $16^2$, respectively. The binarization process requires 4.5 operations per pixel on the average. Thus to build the binary pyramid needs $\delta = (4^2+8^2+16^2) \times 4.5 = 1512$ operations per block.

As for the block matching process, because the data storage techniques are different from level to level, the operations required for each level are analyzed individually. In level 1, each pack of four blocks stored in the 4 SINT bins forms a matching unit, which contains the data in the current row where the four blocks are sequentially stored. To complete the derivation of the four SoDs, it takes fifteen operations for every row of the block within the search window. The fifteen operations include one register shifting for XOR, three AND operations and three shift operations to extract the four bit-wise SoDs, four table lookup operations, and four addition operations to accumulate the SoDs of the four macroblocks processed concurrently. Hence, the total operations at level 1 for each macroblock are $$\delta_{Lv1} = (15 \times 4) \times \left(\frac{R}{2}-1\right)^2 \times \frac{1}{4} = 15 \times \left(\frac{R}{2}-1\right)^2.$$

The computational analysis of level 2 is similar to level 1 but with a larger block size and a dynamic search range, which is computed with the six motion vector candidates form the current and the previous frames. In level 2, each pack of two blocks stored in the 2 SINT bins forms a matching unit, which contains the data in the current row where the two blocks are sequentially stored. To complete the derivation of the two SoDs, it takes seven operations for every row of the block within the search window. The seven operations include one register shifting for XOR, one AND operation and one shift operation to extract the two bit-wise SoDs, two table lookup operations, and two addition operations to accumulate the SoDs of the four macroblocks processed concurrently. The number of search locations is $(r_{max}^x - r_{min}^x + 1) \times (r_{max}^y - r_{min}^y + 1)$ and 8 SINT bins cover all rows of two Level 2 blocks of size 8×8. Thus, level 2 search needs $$\delta_{Lv2} = 8 \times 7 \times (r_{max}^x - r_{min}^x + 1) \times (r_{max}^y - r_{min}^y + 1) \times \frac{1}{2}$$

operations per block.

The computational analysis of level 3 is similar to level 2 but with a larger block size and a fixed search range. The number of search locations is 25 and 16 SINT bins cover all rows of a Level 3 block of size 16×16. Thus, level 3 search needs $\delta_{Lv3} = 16 \times 3 \times 25 = 1200$ operations per block.

To build the binary pyramid needs $\delta_C = (4^2+8^2+16^2) \times 4.5 = 1512$ operations per block. The number $\delta_{Lv1}$ of total operations at level 1 for each macroblock is $15 \times (R/2-1)^2$. The numbers $\delta_{Lv2}$ and $\delta_{Lv3}$ of operations per block at level 2 and level 3 are $28 \times (r_{max}^x - r_{min}^x + 1) \times (r_{max}^y - r_{min}^y + 1)$ and 1200 respectively. Therefore, total number of operations required for 'ABME_$H_4$' is $\delta_{ABME\_H_4} = \delta_C + \delta_{Lv1} + \delta_{Lv2} + \delta_{Lv3} = 2712 + 15 \times (R/2-1)^2 + (r_{max}^x - r_{min}^x + 1) \times (r_{max}^y - r_{min}^y + 1)$.

The use of the 2-D systolic arrays for parallel XOR block matching modules at level 1, level 2 and level 3, which is called as 'ABME_$H_4$_HW', reduces the total operations per macroblock to $$\delta_{\text{ABME\_H}_A\_\text{HW}} = \delta_C + \delta'_{Lv1} + \delta_{Lv2} + \delta'_{Lv3}$$

$$= 1512 + \left(\frac{R}{2} - 1 + 4\right) + (r^x_{\max} - r^x_{\min} + 8) + (5 - 1 + 16)$$

$$= 1542 + \left(\frac{R}{2}\right) + (r^x_{\max} - r^x_{\min} + 1)$$

Comparing the values of $\delta_{ABME\_H_4}$, $\delta_{ABME\_H_4\_HW}$ and $\delta_{FS}$, this invention outperforms the full search, which is consistent with the computational complexities as shown in FIG. 10 for various search ranges.

The following analyzes total memory bandwidth for loading the data from the current and reference frames. For the full search, the total bandwidth consumption in bytes per second is $\zeta_{FS} = (\zeta_{FS\_Cur} + \zeta_{FS\_Ref}) \times F_r$, where $\zeta_{FS\_Cur}$ and $\zeta_{FS\_Ref}$ are the memory bandwidth to access the data for the current and reference frames respectively. Assume that the current block is loaded simultaneously into on-chip memory with 16×16 UCHAR bins. Thus, to access the data for, the current frame of size W×H requires $\zeta_{FS\_Cur} = W \times H$ bytes.

Assume that the reference block is loaded simultaneously into on-chip memory with $(16+2R)^2$ UCHAR bins. When moving to the next block, the data for overlapped area are reused and the bandwidth required is 16×(16+2R). Thus, to completely load the data from the reference frame needs additional $$\zeta_{FS\_Ref} = \frac{H}{16} \times \left[(16 + 2R)^2 + \left(\frac{W}{16} - 1\right) \times (16 + 2R) \times 16\right]$$

bytes. The first term search window, which takes more operations due to the memory stall in the initialization stage of pipelining. Because the rest search windows are overlapped with its previous one, fewer operations are needed.

For the motion estimation of this invention, the total memory bandwidth consumption in bytes used in x86 system with and without hardware acceleration using the 2-D systolic arrays:

$$\zeta_{ABME\_H_4} = (\zeta_{Cur} + \zeta_{Lv1} + \zeta_{Lv2} + \zeta_{Lv3}) \times F_r \text{ and } \zeta_{ABME\_H_1\_HW} = (\zeta_{Cur} + \zeta'_{Lv1} + \zeta_{Lv2} + \zeta'_{Lv3}) \times F_r,$$

respectively. The term $\zeta_{Cur}$ indicates the bandwidth consumption for loading the current frame. The remaining terms $\zeta_{Lv1}$, $\zeta'_{Lv1}$ $\zeta_{Lv2}$, $\zeta_{Lv\,3}$, and $\zeta'_{Lv3}$ denote the bandwidth required for accessing the reference frame.

In x86 systems without hardware acceleration using the 2-D systolic arrays, the memory bandwidth (bytes) to load every block of the current frame is $$\zeta_{Cur} = \left(\frac{1}{16} + \frac{1}{4} + 1\right) \times HW \times \frac{1}{8} \approx 0.164 \times W \times H.$$

Based on the reusability of the data already in the registers, the memory bandwidth required for each pyramid level to load reference data within a search window per frame is $$\zeta_{Lv1} = \left(\frac{H}{4 \times 4}\right) \times \left[\left(4 + \frac{R}{2} - 1\right) \times \left(4 \times 4 + \frac{R}{2} - 1\right) + \left(\frac{W}{4 \times 4} \times \frac{1}{4} - 1\right) \times \left(4 + \frac{R}{2} - 1\right) \times 16\right] \times \frac{1}{8},$$

$$\zeta_{Lv2} = \left(\frac{H}{2 \times 8}\right) \times \left[(8 + r^y_{\max} - r^y_{\min} + 1) \times (8 \times 2 + r^x_{\max} - r^x_{\min} + 1) + \left(\frac{W}{2 \times 8} \times \frac{1}{2} - 1\right) \times (8 + r^x_{\max} - r^y_{\min} + 1) \times 16\right] \times \frac{1}{8},$$

$$\zeta_{Lv3} = \left[(16 + 5)^2 + \left(\frac{W}{16} - 1\right) \times 16 \times (16 + 5)\right] \times \frac{H}{16} \times \frac{1}{8}.$$

Where for easy calculation of the memory bandwidth required for each frame at level 2, the worst case of the search range is set as [−3,3] for both x and y dimensions.

When the XOR matching modules at levels 1, 2 and 3 are implemented with 2-D systolic array architecture, the memory bandwidths required for loading reference data within a search window per frame are $$\zeta'_{Lv1} = \left(\frac{H}{4 \times 4}\right) \times \left[\left(4 + \frac{R}{2} - 1\right)^2 \times \left(\frac{W}{4 \times 4} - 1\right) \times \left(4 + \frac{R}{2} - 1\right) \times 4\right] \times \frac{1}{8},$$

$$\zeta'_{Lv2} = \left(\frac{H}{2 \times 8}\right) \times \left[(8 + r^y_{\max} - r^y_{\min} + 1) \times (8 + r^x_{\max} - r^x_{\min} + 1) + \left(\frac{W}{2 \times 8} - 1\right) \times (8 + r^x_{\max} - r^x_{\min} + 1) \times 8\right] \times \frac{1}{8},$$

and $\zeta'_{Lv3} = \zeta_{Lv3}$, respectively. This invention significantly reduces the bus bandwidth as compared to the full search. As the search range is increased, the memory bandwidth for the full search is increased dramatically and those for the motion estimation of the invention is increased slightly only due to the increased $\zeta_{Lv1}$ and $\zeta'_{Lv1}$. As opposed to the high sensitivity with various R to the memory bandwidth for the full search, the motion estimation of the invention is insensitive to the search range variation since the frame size at level 1 is the smallest and the data from the consecutive blocks can be stored in a larger bin. Such superior performances are consistent with the observations as shown in FIG. 10.

To show the performance of this invention over the full search, the invention uses MPEG-4 reference video encoder and employs a macroblock with size 16×16 for block matching. The performance comparison shown in FIG. 11 is analyzed based on the factors including the video sequences, the encoding conditions, various decimation filters, the motion estimation approaches, and the visual quality of the reconstructed video in PSNR values.

The video sequences with CIF format including Coastguard, Foreman, and Akiyo and the sequences with QCIF format covering Container and Mother-Daughter are used for testing. The six sequences characterize a variety of spatial and motion activities. The invention further tests two CCIR601 sequences, including Table Tennis and Stefan, which consist of fast moving objects. The fast moving objects within a picture of larger size are adopted to examine the performance and the computational load of the motion estimation of the invention. Each source sequence consists of 300 frames.

As for the encoding conditions, each sequence is encoded under the conditions recommended by MPEG committee. The target frame rate is set as 10 fps and the bit rates range from 10 kbps to 2M bps for various sequences. For finding the precise motion vector, the search range is ±16 for each sequence and the range is increased to ±32 for the CCIR-601 sequences.

As for the motion search range for the level 2 search, the range of size $([r_{min}^x, r_{max}^x], [r_{min}^y, r_{max}^y]=([-3,3],[-3,3])$ can provide satisfactory motion vectors of level 2 empirically and thus is used for the complexity estimation in FIG. 11.

As for the decimation filters, this invention uses three two-dimensional (2-D) filters and three 1-D separable filters to analyze how various filters impact the binarization and coding efficiency of the motion estimation. The three 2-D filters, denoted as $H_A$, $H_B$, and $H_C$, are filters although it is not designed with specific filter design methodology. The three 1-D filters are:

$H_{20}=[-1, 0, 4, 15, 33, 49, 56, 49, 33, 15, 4, 0, -1]/256$, $H_{25}=[-1, -2, 0, 11, 32, 55, 66, 55, 32, 11, 0, -2, -1]/256$, and $H_{30}=[-1, -2, -4, 4, 30, 62, 78, 62, 30, 4, -4, -2, -1]/256$.

Based on the complexity analysis from FIG. 10 and the performance comparison from FIG. 11, it can be seen as compared to the full search, this invention not only takes the benefits of low computational complexity and low memory bandwidth consumption but also is insensitive to search range increase. The invention also demonstrates that with better binarization methods, the visual quality can be further improved. With this feature, it can provide flexible configurations. System designers can choose the binarization methods depending on the available memory, computational power, display resolution, or data bus bandwidth provided by their system. For example, the characteristics of wireless mobile phones have less computational power, lower display resolution and less available memory. Thus, the smallest filters should be used for the best execution speed while its visual quality is still acceptable for the low-resolution display. On the other hand, for a faster machine such as today's personal computers or high-end DSP systems, the filter with better frequency response can be applied since its compu- $$H_A = \frac{1}{4}\begin{bmatrix} 0 & 1 & 0 \\ 1 & 0 & 1 \\ 0 & 1 & 0 \end{bmatrix}, H_B = \frac{1}{4}\begin{bmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{bmatrix}, H_C = \frac{1}{4}\begin{bmatrix} 0 & 0 & 0 & 1 & 0 & 0 & 0 \\ 0 & 0 & 0 & 0 & 0 & 0 & 0 \\ 0 & 0 & 0 & 0 & 0 & 0 & 0 \\ 1 & 0 & 0 & 0 & 0 & 0 & 1 \\ 0 & 0 & 0 & 0 & 0 & 0 & 0 \\ 0 & 0 & 0 & 0 & 0 & 0 & 0 \\ 0 & 0 & 0 & 1 & 0 & 0 & 0 \end{bmatrix}.$$

The frame $S_l(x, y)$ that is extracted with the filters $H_B$ or $H_C$ retains more high frequency information than the frame that is extracted with the filter $H_A$.

The three 1-D filters are three separable 13-tap Hamming filters with distinct cutoff frequencies at 20%, 25% and 30% of Nyquist frequency. For further reduction in filter complexity, every filter of the 1-D filters is a linear phase FIR filter with coefficients in the form of $k \cdot 2^{-m}$. For a 1-D filter with M taps, i.e. $H=[h_1, h_2, \ldots, h_M]$, the lowpass frame is computed as tational power can afford more complexity. In addition, various optimization methods can be developed for specific platforms with different register size. Thus, the motion estimation of the invention is more flexible than other motion search algorithms.

The invention also demonstrates platform specific optimizations for several hardware architectures including x86, SIMD using MMX and systolic arrays. From the operation counts, the motion estimation of the invention is very desirable for software implementation on a general-purpose $$\overline{F}_1(x, y) = H(F_1(x, y)) = \sum_{d=1}^{M} h_d * F_1\left(x + d - \frac{M+1}{2}, y\right) = \left(\sum_{d=1}^{M} k_d * F_1\left(x + d - \frac{M+1}{2}, y\right)\right) \cdot 2^{-m},$$

where $m = \log_2\left(\sum_{d=1}^{M} k_d\right)$.

For instance, a 5-tap filter with the coefficients of $H=[1, 4, 6, 4, 1] \cdot 2^{-4}$ can be implemented with only shift and add operations. The typical cost of such operations on various modern computer architectures is one cycle. Thus, this type of filter can achieve significant speedup over the original processor system. It can also be realized with a parallel-pipelined implementation for ASIC design and allows tradeoffs between Silicon area, power consumption, and visual quality during the hardware design phase. Thus, the motion estimation of this invention is versatile and effective for multimedia systems in both software and hardware platforms.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for motion estimation in video encoding, comprising:
    a binary pyramid construction module for transforming video images into first, second and third binary layers;
    a static-state checking module determining if said apparatus is in a static mode or a normal mode based on repeat occurrence of final motion vectors;
    a first level search module receiving said first binary layer and performing parallel XOR block matching with a ±3 pixel refinement window in a first level and generating a first level motion vector for said normal mode;
    a second level search module receiving said second binary layer and using six motion vector candidates to determine a second level motion vector for said normal mode;
    a third level search module receiving said second level motion vector and performing parallel XOR block matching with a ±2 pixel refinement window in a third level and generating a final motion vector for said normal mode;
    a fine tuning module performing parallel XOR block matching with a ±1 pixel refinement window and generating a final motion vector for said static mode; and
    a state update module registering and updating said repeat occurrence of final motion vectors.

2. The apparatus for motion estimation as claimed in claim 1, wherein said binary pyramid construction module has a filtering module, a binarization module and a decimation module.

3. The apparatus for motion estimation as claimed in claim 1, wherein said first level search module comprises a data loading module receiving said first binary layer, a bit alignment module coupled to said data loading module for aligning a current block and a reference block with a ±3 pixel refinement window in said first level, and a parallel XOR block matching module for generating a first level motion vector with a criterion based on minimum bit-wise sum of difference.

4. The apparatus for motion estimation as claimed in claim 3, said parallel XOR block matching module further comprising a table lookup sub-module and a bit-wise sum of difference sub-module.

5. The apparatus for motion estimation as claimed in claim 1, wherein said six motion vector candidates are motion vectors corresponding to an upper right block, an upper block, and a left block, an initial motion vector of a current block from said first level, a motion vector of a temporally previous block and a zero motion vector respectively.

6. The apparatus for motion estimation as claimed in claim 3, wherein said second level search module comprises:
    a motion offset module determining a search range of motion vector offsets based on said six motion vector candidates;
    a data loading module receiving said second binary layer, and said search range from said motion offset module;
    a bit alignment module for aligning a current block and a reference block; and
    a parallel XOR block matching module;
    wherein said bit alignment module and said parallel XOR block matching determine said second level motion vector by checking motion vectors corresponding to said search range determined by said motion offset module.

7. The apparatus for motion estimation as claimed in claim 6, said parallel XOR block matching module in said second level search module further comprising a table lookup sub-module and a bit-wise sum of difference (SoD) sub-module.

8. The apparatus for motion estimation as claimed in claim 6, wherein said third level search module comprises a data loading module receiving said third binary layer and said second level motion vector, a bit alignment module coupled to said data loading module for aligning a current block and a reference block with a ±2 pixel refinement window in said third level, and a parallel XOR block matching module for generating a final motion vector with a criterion based on minimum bit-wise sum of difference.

9. The apparatus for motion estimation as claimed in claim 8, said parallel XOR block matching module in said third level search module further comprising a table lookup sub-module and a bit-wise sum of difference (SoD) sub-module.

10. The apparatus for motion estimation as claimed in claim 1, wherein said state update module further comprises a counter for registering repeat occurrence of said final motion vectors within previous frames, said counter is increased by 1 if a same final motion vector within said previous frames repeats, and said counter is reset to zero if said counter is larger than a predefined constant or if a different final motion vector is found.

11. The apparatus for motion estimation as claimed in claim 10, wherein said static-state checking module sets said apparatus in said static mode if said counter for registering repeat occurrence of said final motion vectors within said previous frames is greater than a pre-defined constant.

12. The apparatus for motion estimation as claimed in claim 1, wherein said binary pyramid construction module, said first level search module, said second level search module and said third level search module are implemented in a pipelined architecture.

13. The apparatus for motion estimation as claimed in claim 1, wherein said binary pyramid construction module, said first level search module, said second level search module or said third level search module is implemented by systolic arrays.

14. The apparatus for motion estimation as claimed in claim 1, wherein said first level search module, said second level search module or said third level search module comprises a search circuit having:
    a first storage unit storing binary data of a current block;
    a delay circuit coupled to said first storage unit;
    a second storage unit storing binary data of a reference block;
    an on-chip memory module receiving data from said second storage unit; and
    a multiplexer coupled to said on-chip memory module and providing a plurality of outputs; and a two dimensional systolic array having a plurality of rows of systolic cells, each systolic cell having a first input for receiving data from said delay circuit, each systolic cell in a row except a first systolic cell having a second input coupled to an output of a preceding systolic cell in a same row;

wherein a first systolic cell in each row of systolic cells has a second input coupled to an output of said multiplexer.

15. The apparatus for motion estimation as claimed in claim 14, wherein each systolic cell comprises:

a decoder;

an XOR unit having an output connected to an input of said decoder, a first input connected to the first input of the systolic cell, and a second input connected to the output of the systolic cell;

a first delay unit connected between the second input and the output of the systolic cell;

a second delay unit;

a summation unit having a first input coupled to an output of said decoder, and an output connected to said second delay unit; and a switch unit for controlling connection between an output of said second delay unit and a second input to said summation unit.

16. A method of motion estimation for video encoding, comprising the steps of:

(a) constructing a binary pyramid by transforming video images into first, second and third binary layers;

(b) determining if said method is in a static mode or a normal mode based on repeat occurrence of final motion vectors;

(c) performing parallel XOR block matching with a ±1 pixel refinement window and generating a final motion vector if said method is in said static mode;

(d) executing a first level search by performing parallel XOR block matching in said first binary layer with a ±3 pixel refinement window in a first level and generating a first level motion vector if said method is in said normal mode;

(e) executing a second level search in said second binary layer according to six motion vector candidates and determining a second level motion vector if said method is in said normal mode;

(f) executing a third level search in said third binary layer according to said second level motion vector and performing parallel XOR block matching with a ±2 pixel refinement window in a third level and generating a final motion vector if said method is in said normal mode; and (g) registering and updating said repeat occurrence of final motion vectors.

17. The method for motion estimation as claimed in claim 16, wherein said step (a) includes filtering, binarization and decimation.

18. The method of motion estimation as claimed in claim 16, wherein said step (d) is accomplished by aligning a current block and a reference block with a ±3 pixel refinement window in said first level using parallel XOR block matching with a criterion based on minimum bit-wise sum of difference.

19. The method of motion estimation as claimed in claim 16, wherein said six motion vector candidates are motion vectors corresponding to an upper right block, an upper block, and a left block, an initial motion vector of a current block from said first level, a motion vector of a temporally previous block and a zero motion vector respectively.

20. The method of motion estimation as claimed in claim 16, wherein said step (e) comprises:

(e1) determining a search range of motion vector offsets based on said six motion vector candidates; and (e2) determining said second level motion vector by checking motion vectors corresponding to check points within said search range using XOR block matching with a criterion based on minimum bit-wise sum of difference.

21. The method of motion estimation as claimed in claim 16, wherein said step (f) is accomplished by aligning a current block and a reference block with a ±2 pixel refinement window in said third level using parallel XOR block matching for generating said final motion vector with a criterion based on minimum bit-wise sum of difference.

22. The method of motion estimation as claimed in claim 16, wherein said step (g) uses a counter for registering repeat occurrence of said final motion vectors within previous frames, said counter is increased by 1 if a same final motion vector within said previous frames repeats, and said counter is reset to zero if said counter is larger than a predefined constant or if a different final motion vector is found.

23. The method of motion estimation as claimed in claim 22, wherein said method is in said static mode if said counter for registering repeat occurrence of said final motion vectors within said previous frames is greater than a pre-defined constant.

* * * * *